US009434229B2

(12) United States Patent
Hilton (10) Patent No.: US 9,434,229 B2
(45) Date of Patent: Sep. 6, 2016

(54) SUSPENSION CONTROL SYSTEM (75) Inventor: Christopher David Hilton, Berkshire (GB)

(73) Assignee: PROTEAN ELECTRIC LIMITED (GB)

( * ) Notice: Subject to any disclaimer, the term of this patent is extended or adjusted under 35 U.S.C. 154(b) by 54 days.

(21) Appl. No.: 14/002,707

(22) PCT Filed: Feb. 8, 2012

(86) PCT No.: PCT/IB2012/050570
§ 371 (c)(1),
(2), (4) Date: Nov. 11, 2013

(87) PCT Pub. No.: WO2012/117305
PCT Pub. Date: Sep. 7, 2012

(65) Prior Publication Data
US 2014/0058606 A1 Feb. 27, 2014

(30) Foreign Application Priority Data
Mar. 1, 2011 (GB) .................................. 1103463.4

(51) Int. Cl.
*B60L 9/00* (2006.01)
*B60L 11/00* (2006.01)
(Continued)

(52) U.S. Cl.
CPC ............ *B60G 17/0157* (2013.01); *B60G 17/08* (2013.01); *B60L 15/20* (2013.01); *B60G 2204/30* (2013.01); *B60G 2300/50* (2013.01); *B60G 2500/10* (2013.01); *B60K 1/00* (2013.01); *B60K 7/0007* (2013.01); *B60L 2220/44* (2013.01); *B60L 2260/28* (2013.01); *Y02T 10/7258* (2013.01)

(58) Field of Classification Search
CPC .......... B60G 2500/10; B60G 2204/10; B60G 17/0157; B60K 1/00
USPC ............ 701/42, 22; 318/587; 180/65.5, 65.1
See application file for complete search history.

(56) References Cited

U.S. PATENT DOCUMENTS 3,842,753 A 10/1974 Theodore et al.
5,376,868 A * 12/1994 Toyoda et al. ................ 318/587
(Continued)

FOREIGN PATENT DOCUMENTS

GB 2262794 A 6/1993
GB 2459061 A 10/2009
(Continued)

OTHER PUBLICATIONS

International Search Report, May 25, 2012, p. 1-2, WIPO, EPO.
(Continued)

*Primary Examiner* — Helal A Algahaim
*Assistant Examiner* — Mahmoud Ismail
(74) *Attorney, Agent, or Firm* — The Mason Group Patent Specialists LLC; Valerie M. Davis (57) ABSTRACT

A suspension control system for a vehicle having a wheel (52) mounted to the vehicle via a suspension device mounted to a mounting point on the vehicle with an electric motor being arranged to apply to the wheel a torque for driving the wheel, the suspension control system comprising a controller arranged to modulate a torque applied to the wheel by the electric motor based on the relative longitudinal movement of the wheel with respect to the mounting point on the vehicle.

10 Claims, 7 Drawing Sheets

(51) Int. Cl.
*G05D 1/00* (2006.01)
*G05D 3/00* (2006.01)
*G06F 7/00* (2006.01)
*G06F 17/00* (2006.01)
*B60G 17/015* (2006.01)
*B60G 17/08* (2006.01)
*B60L 15/20* (2006.01)
*B62D 6/00* (2006.01)
*B62D 11/00* (2006.01)
*B62D 12/00* (2006.01)
*B63G 8/20* (2006.01)
*B63H 25/04* (2006.01)
*G06F 19/00* (2011.01)
*B60K 1/00* (2006.01)
*B60K 7/00* (2006.01)

(56) References Cited

U.S. PATENT DOCUMENTS

2007/0272458 A1* 11/2007 Taniguchi et al. .......... 180/65.5
2010/0191423 A1* 7/2010 Koyama et al. ................ 701/42

FOREIGN PATENT DOCUMENTS

WO 2009075151 A 6/2009
WO 2010131091 A 11/2010

OTHER PUBLICATIONS

Search Report, Mar. 31, 2011, p. 1, Intellectual Property Office, GB.

* cited by examiner

SUSPENSION CONTROL SYSTEM

FIELD OF THE DISCLOSURE

The present invention relates to a suspension control system, in particular a suspension control system for a vehicle having a wheel driven by an electric motor.

BACKGROUND

The suspension system of a vehicle has two principle functions, first to isolate the vehicle body and consequently the vehicle's passengers from road inputs, and second to improve the vehicle's road holding by reducing the load variation between the wheels of the vehicle and the ground.

The behaviour of a vehicle's suspension system can be characterised in terms of the suspension system's vertical and longitudinal compliance.

The vertical compliance of vehicle suspension systems is typically created by spring-damper systems that are tuned to provide a good compromise between passenger comfort and handling performance. The springs are chosen to have a resonant frequency of the sprung mass between about 0.7 Hz and 2 Hz. Lower resonant frequencies induce travel sickness whereas higher frequencies reduce the suppression of road inputs. Stiff damping results in a harsh ride but soft damping results in long lasting car body motion following disturbance and large load variation between wheel and road.

In contrast, to maintain good wheel control the longitudinal compliance of a vehicle is generally significantly stiffer than that of the vertical compliance; otherwise the torque provided by the brake or drive-train acts on the vehicle body through a soft suspension system, thereby reducing the driver's ability to maintain vehicle control. As a consequence the longitudinal compliance of a vehicle's suspension system is typically provided primarily by bushings.

As with the vertical compliance of a suspension system, there is also a compromise with respect to the longitudinal compliance between passenger comfort, which is increased by softening the damping, and the need to dampen oscillations in the cabin to maintain good vehicle control.

For example, a road surface disturbance such as a pot-hole induces a longitudinal force impulse on a vehicle's wheel, where the longitudinal force causes an initial shock that is felt by the occupants of the vehicle followed by a vibration. Increasing the longitudinal stiffness increases the initial shock but reduces the duration of the subsequent vibration for a given road disturbance.

Figure 1:
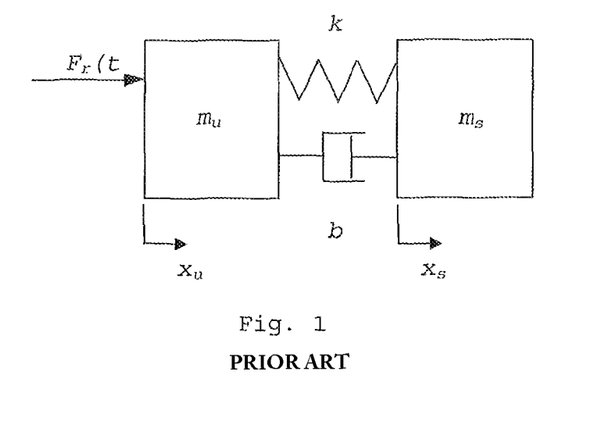
FIG. 1 illustrates a model for the longitudinal behaviour of a suspension system.

The longitudinal behaviour of a suspension system can be illustrated with the simplified quarter-car two degree-of-freedom model shown in FIG. 1. $m_u$ represents the unsprung mass, for example a wheel and associated parts, and $m_s$ represents the sprung mass, the quarter-car body. The longitudinal compliance of the suspension is represented by the spring-damper system with spring constant k and damping constant b. The positions of the unsprung and sprung mass in the longitudinal direction are shown as $x_u$ and $x_s$ respectively. The longitudinal component of the force imparted by the road surface on the unsprung mass is shown as $F_r(t)$.

The motion of the sprung mass in response to an imperfect road surface generally determines the comfort of the vehicles passengers. The key features of motion associated with passenger discomfort are the magnitude and duration of the rate of change of acceleration, otherwise known as vehicle jerk, resulting from road surface imperfections.

In response to a shock, such as that caused by a wheel of a vehicle hitting a pot-hole in a road surface, there is an initial high magnitude jerk followed by oscillations. Both of these features can be unpleasant to a passenger of a vehicle. However, whereas the optimum means for minimising the initial jerk requires weak damping, in contrast the optimum means for minimising the subsequent oscillations requires strong damping.

Figure 2:
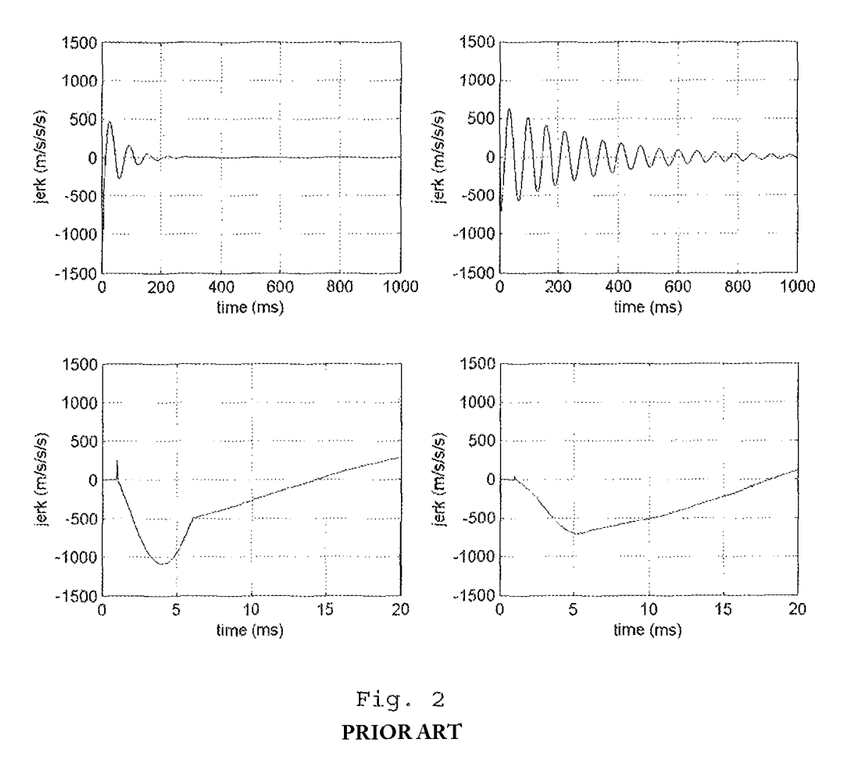
FIG. 2 illustrates the effect of an external longitudinal force on a suspension system having strong and weak damping.

FIG. 2 illustrates the conflict between the requirements for strong and weak damping with respect to longitudinal compliance for a passive suspension system, where the left hand plot 20 in FIG. 2 reflects rate of change of acceleration versus time for a strong damping system and the right hand plot 22 in FIG. 2 reflects rate of change of acceleration versus time for a weak damping system. For the purposes of the plots illustrated in FIG. 2, the plots are based on the simplified quarter car two degree of freedom model illustrated in FIG. 1 using the following parameters: $m_u$=50 kg, $m_s$=400 kg, k=444 N/mm. For the strong damping plots b=1.5 Ns/mm and for the weak damping plots b=0.3 Ns/mm. Both masses are initially moving at 15 m/s and a pot-hole strike is simulated by constructing $F_r(t)$ as a half sinusoid of duration 5 ms and amplitude 10000 N. This imparts an initial acceleration of about 200 m/s/s to the unsprung mass, i.e. the wheel. The plots illustrated in FIG. 2 show the resulting jerk as a function of time of the sprung mass, i.e. the vehicle body.

The upper plots illustrated in FIG. 2 show that the weak damped system leads to a long-lasting longitudinal oscillation of the vehicle body whereas the strong damped system quickly suppresses oscillations after the initial impact. The lower plots show the same data on an expanded time-scale to show the rate of change of acceleration of the vehicle body shortly after the impact time. The maximum magnitude of the jerk in the strongly damped case is about 1100 m/s/s/s whereas it is about 700 m/s/s/s in the weakly damped case. This figure represents the initial shock felt by the occupants of the vehicle.

BRIEF SUMMARY

As such, a suspension system having a longitudinal compliance that is defined by either a strong or weak damper system fails to provide optimum vehicle control and vehicle passenger ride comfort.

It is desirable to improve this situation.

In accordance with an aspect of the present invention there is provided a suspension control system according to the accompanying claims.

This provides the advantage of allowing the longitudinal compliance damping characteristics to be actively modified, where a longitudinal damping force applied to a wheel of a vehicle can be varied by modifying the torque applied to the wheel from an electric motor based on the relative movement of the wheel. For example, a weak damping force can initially be applied upon a longitudinal jerk first occurring with the damping force gradually being increased by modifying the torque applied to the wheel to apply further dampening to the subsequent oscillations. Accordingly, the present invention allows for the combination of the suppression of oscillations of the strong damping with the initial impact softness of the weakly damped case.

As such, a vehicle can be provided with a softly damped longitudinal passive suspension system, which is used to minimise the initial shock felt by passengers of the vehicle resulting from a road surface disturbance, with an electric motor being used to modulate the torque applied to a wheel of the vehicle to strengthen the longitudinal damping after the initial shock to minimise the subsequent oscillations.

BRIEF DESCRIPTION OF THE FIGURES

The present invention will now be described by way of example, with reference to the accompanying drawings, in which.

DETAILED DESCRIPTION

Figure 3:
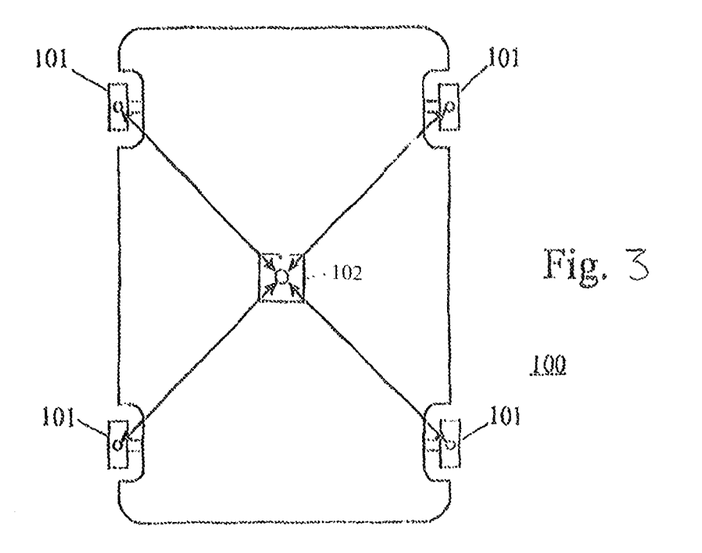
FIG. 3 illustrates a vehicle according to an embodiment of the present invention.

FIG. 3 illustrates a vehicle 100, for example a car or lorry, having four wheels 101, where two wheels are located in the vehicles forward position in a near side and off side position respectively. Similarly, two additional wheels are located in the vehicles aft position in near side and off side positions respectively, as is typical for a conventional car configuration. However, as would be appreciated by a person skilled in the art, the vehicle may have any number of wheels.

Incorporated within each wheel 101 is an in-wheel electric motor, as described in detail below. Although the current embodiment describes a vehicle having an in-wheel electric motor associated with each wheel 101, as would be appreciated by a person skilled in the art only a subset of the wheels 101 may have an associated in-wheel electric motor. For example, for a four wheeled vehicle only the front two wheels may have associated in-wheel motors or alternately only the rear two wheels may have associated in-wheel motors or only a single wheel may have an associated in-wheel electric motor. Although the present embodiment describes the wheels being driven by a respective in-wheel electric motor, the respective electric motors may be located in any position within the vehicle.

Each wheel and associated in-wheel electric motor is coupled to a suspension device, for example a suspension arm, which in turn is coupled to a fixed mounting point on a part of the main vehicle body, for example the vehicle chassis. The suspension device provides isolation between the body of the vehicle and road inputs applied to the wheels, where the wheels and electric motors correspond to the vehicles unsprung mass and the vehicles body corresponds to the vehicles sprung mass.

Figure 5:
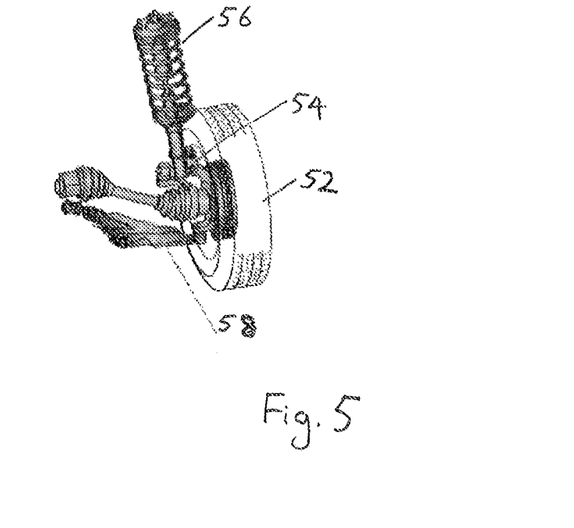
FIG. 5 illustrates an example of a passive suspension arrangement.

An illustration of an example of a suspension arrangement is shown in FIG. 5, where a wheel 52 and its associated bearing is attached to an upright element 54 that is attached to both a spring damping device 56 and to a suspension control arm 58. Both the suspension control arm 58 and spring damping device 56, for example a coil spring are attached to the main vehicle body.

Coupled to each in-wheel electric motor is a vehicle controller 102 for controlling the operation of the in-wheel electric motors, for example controlling the torque generated by the in-wheel electric motors.

Additionally, the vehicle includes a battery for providing a power source for the in-wheel electric motors.

For the purpose of illustration, the in-wheel electric motor is of the type having a set of coils being part of the stator for attachment to the vehicle, radially surrounded by a rotor carrying a set of magnets for attachment to a wheel. However, as would be appreciated by a person skilled in the art, the present invention is applicable to other types of electric motors.

Figure 4:
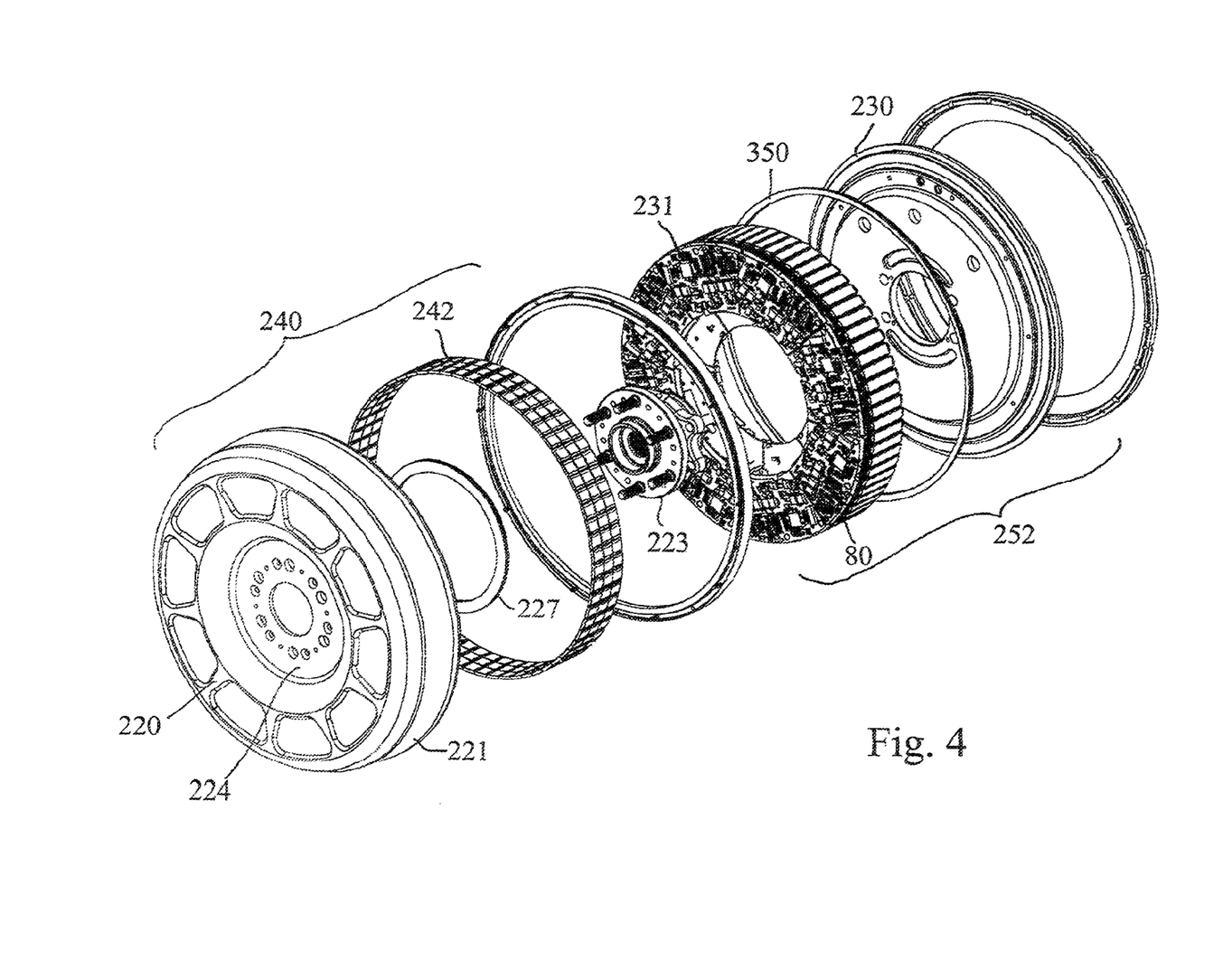
FIG. 4 illustrates an exploded view of an electric motor as used in an embodiment of the present invention.

As illustrated in FIG. 4, the in-wheel electric motor 40 includes a stator 252 comprising a rear portion 230 forming a first part of the housing of the assembly, and a heat sink and drive arrangement 231 comprising multiple coils and electronics to drive the coils. The coil drive arrangement 231 is fixed to the rear portion 230 to form the stator 252 which may then be fixed to a vehicle and does not rotate during use. The coils themselves are formed on tooth laminations which together with the drive arrangement 231 and rear portion 230 form the stator 252.

A rotor 240 comprises a front portion 220 and a cylindrical portion 221 forming a cover, which substantially surrounds the stator 252. The rotor includes a plurality of magnets 242 arranged around the inside of the cylindrical portion 221. The magnets are thus in close proximity to the coils on the assembly 231 so that magnetic fields generated by the coils in the assembly 231 cooperate with the magnets 242 arranged around the inside of the cylindrical portion 221 of the rotor 240 to cause the rotor 240 to rotate.

The rotor 240 is attached to the stator 252 by a bearing block 223. The bearing block 223 can be a standard bearing block as would be used in a vehicle to which this motor assembly is to be fitted with the bearing block being mounted to a suspension device, for example as described above. The bearing block comprises two parts, a first part fixed to the stator and a second part fixed to the rotor. The bearing block is fixed to a central portion 233 of the wall 230 of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

Figure 6:
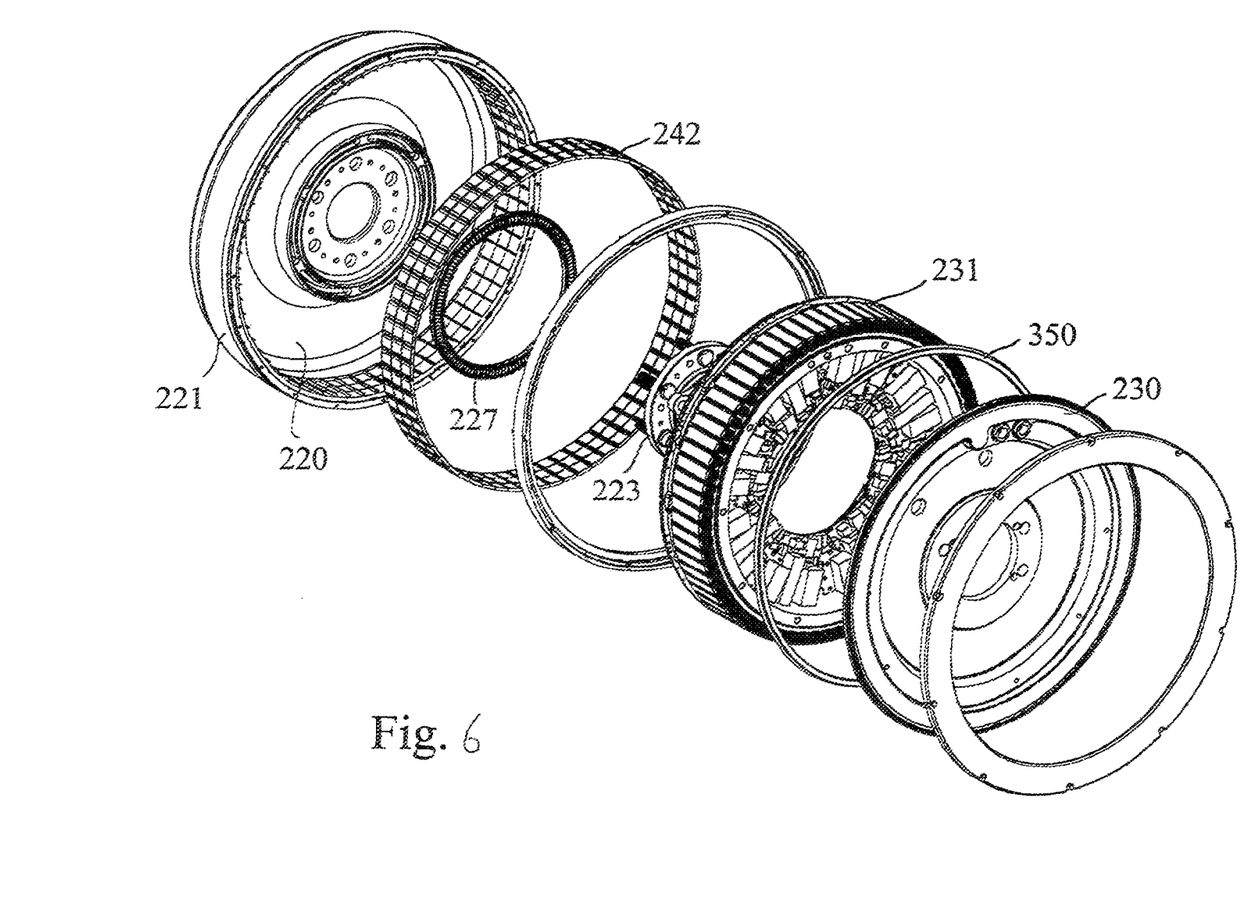
FIG. 6 illustrates an exploded view of the electric motor shown in FIG. 2 from an alternative angle.

FIG. 6 shows an exploded view of the same assembly as FIG. 4 from the opposite side showing the stator 252 comprising the rear stator wall 230 and coil and electronics assembly 231. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

Additionally shown in FIG. 4 are circuit boards 80 carrying control electronics, otherwise known as motor drive controllers or inverters.

A V shaped seal 350 is provided between the circumferential wall 221 of the rotor and the outer edge of the stator housing 230.

The rotor also includes a focussing ring and magnets 227 for rotor position sensing, which in conjunction with sensors mounted on the stator allows for an accurate position determination of the rotor relative to the stator to be made.

Figure 7:
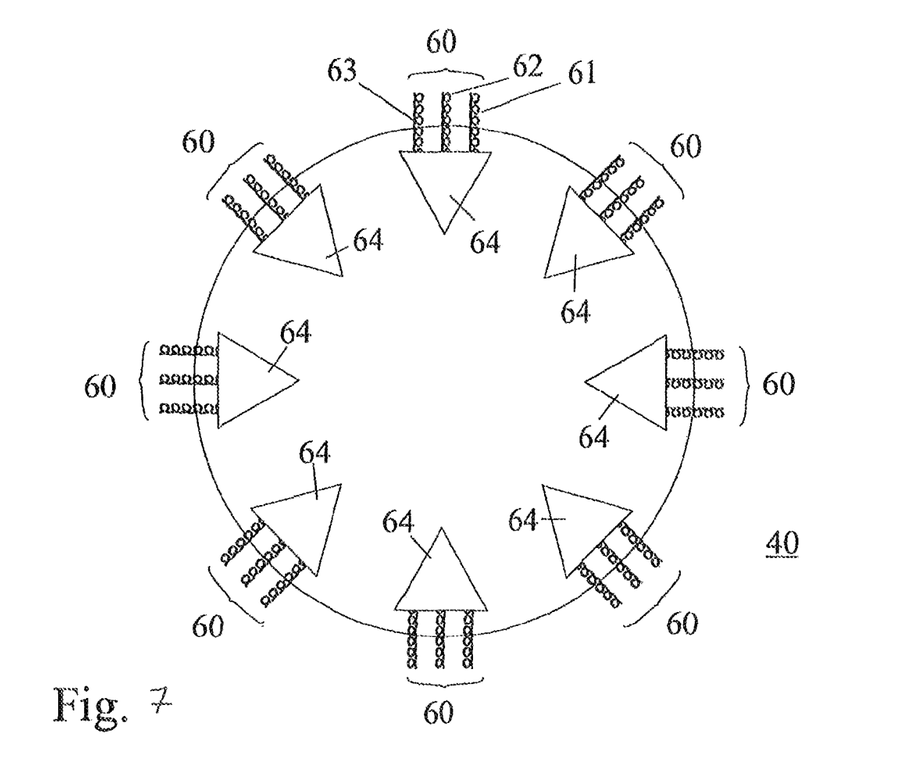
FIG. 7 illustrates an example arrangement of coil sets for an electric motor according to an embodiment of the present invention.

FIG. 7 schematically shows an example of an electric motor 40 in accordance with an embodiment of this invention. In this example, the motor is generally circular. However, it will be appreciated that embodiments of this invention can employ other topologies. For example a linear arrangement of coils for producing linear movement is envisaged.

The motor 40 in this example includes 8 coil sets 60 with each coil set 60 having three coil sub-sets 61, 62, 63 that are coupled to a respective control device 64, where each control device 64 and respective coil sub-sets form a three phase logical or sub electric motor that can be controlled independently of the other sub motors. The control devices 64 drive their respective sub motor with a three phase voltage supply, thereby allowing the respective coil sub-sets to generate a rotating magnetic field. Although the present embodiment describes each coil set 60 as having three coil sub-sets 61, 62, 63, the present invention is not limited by this and it would be appreciated that each coil set 60 could have two or more coil sub-sets. Equally, although the present embodiment describes an electric motor having eight coil sets 60 (i.e. eight sub motors) the motor could have two or more coil sets with associated control devices (i.e. two or more sub motors).

Each control device includes a three phase bridge inverter which, as is well known to a person skilled in the art, contains six switches. The three phase bridge inverter is coupled to the three subset coils of a coil set 60 to form a three phase electric motor configuration. Accordingly, as stated above, the motor includes eight three phase sub-motors, where each three phase sub-motor includes a control device 64 coupled to the three sub-set coils of a coil set 60.

Under the control of the vehicle controller 102 each three phase bridge inverter is arranged to provide PWM voltage control across the respective coil sub-sets 61, 62, 63 to provide a required torque for the respective sub-motors.

For a given coil set the three phase bridge switches of a control device 64 are arranged to apply a single voltage phase across each of the coil sub-sets 61, 62, 63.

Although the in-wheel electric motor described in the present embodiment includes a plurality of logical sub-motors, the electric motor may be of a conventional design without the use of logical sub-motors.

In this embodiment, each control device 80 is substantially wedge-shaped. This shape allows multiple control devices 80 to be located adjacent each other within the motor, forming a fan-like arrangement.

The control device 80 switches can include semiconductor devices such as MOSFETs or IGBTs. In the present example, the switches comprise IGBTs. However, any suitable known switching circuit can be employed for controlling the current. One well known example of such a switching circuit is the three phase bridge circuit having six switches configured to drive a three phase electric motor. The six switches are configured as three parallel sets of two switches, where each pair of switches is placed in series and forms a leg of the three phase bridge circuit.

In response to an acceleration or braking demand from a driver of the vehicle the vehicle controller 102 is arranged to control current flow in the respective motors via the respective control device 80, thereby controlling the torque generated by the respective motors. Additionally the vehicle controller 102 is arranged to modulate the torque being applied by the respective motors dependent on the relative longitudinal or vertical movement or displacement of the wheel 101 with respect to the respective mounting points at which the respective suspension devices are mounted to the vehicle 100. In other words, the vehicle controller 102 is arranged to modulate the torque being applied by the respective motors dependent on the relative longitudinal or vertical movement or displacement of the vehicle's unsprung and sprung masses.

The relative movement or displacement of the vehicle's unsprung and sprung mass can be determined by any suitable means, for example via the use of accelerometers, or velocity, force, position or deflection sensors.

Based on the relative movement or displacement of the vehicle's unsprung mass and sprung mass the vehicle controller 102 is arranged to vary the torque being applied by the respective in-wheel electric motors to the respective wheels resulting in a longitudinal force $F_t(t)$ at the wheel, which in turn modifies the longitudinal behaviour of the suspension.

For example, for a vehicle 100 moving in a positive x direction, when a wheel 101 of the vehicle 100 strikes a pot-hole a displacement between the wheel and the vehicles body occurs. As the wheel 101 starts to recess towards the vehicle body the vehicle controller 102 identifies from sensor information that there is relative movement between the wheel 101 and the vehicles body (i.e. that a displacement has occurred) and the vehicle controller 102 arranges for a positive torque to be applied by the respective in-wheel electric motor, thereby exerting a positive damping force at the wheel.

Additionally, vertical movement of the wheel can be used as an indication of longitudinal movement of the vehicle's wheel and accordingly can be used to determine a suitable torque for generating a longitudinal force at the wheel for modifying the longitudinal behaviour of the suspension.

Figure 8:
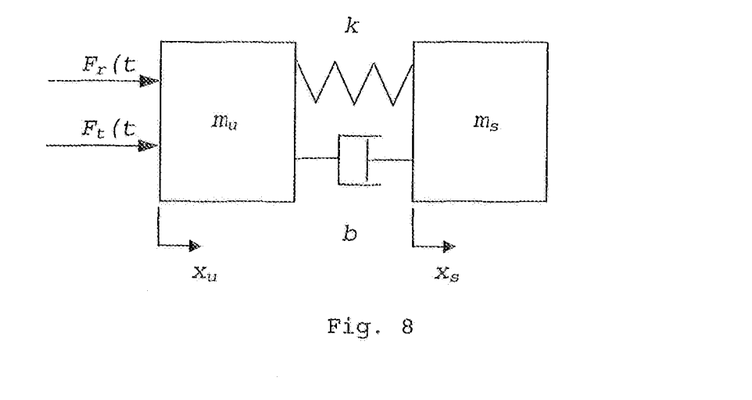
FIG. 8 illustrates a model for the longitudinal behaviour of a suspension system according to an embodiment of the present invention.

Similar to FIG. 1, FIG. 8 illustrates a simplified quarter-car two degree of freedom model that includes the additional longitudinal force $F_t(t)$ generated at a wheel 101 by a respective electric motor, where $m_u$ represents the unsprung mass and $m_s$ represents the sprung mass. The longitudinal compliance of the suspension is represented by the spring-damper system with spring constant k and damping constant b. The positions of the unsprung and sprung masses in the longitudinal direction are shown as $x_u$ and $x_s$ respectively. The longitudinal component of the force imparted by the road surface on the unsprung mass is shown as $F_r(t)$.

Preferably the torque generated by the respective in-wheel electric motors is determined using a control algorithm that calculates the torque based on the respective longitudinal movement of the unsprung mass and sprung mass of the vehicle 100 such that the damping effect provided by the suspension device is varied according to preferred damping characteristics. Any suitable means for determining the relative movement of the unsprung mass and sprung mass may be used, for example this may be changes in velocity, changes in displacement, or changes in acceleration. For the purposes of the present embodiment the control algorithm used is based upon the Sky-Hook technique where the torque applied to the wheel is determined from the equation $T = b_2(\dot{x}_s - \dot{x}_u)r$, where $b_2$ is an active damping coefficient of value 1.2 Ns/mm, $\dot{x}_s$ is the velocity of the sprung mass, $\dot{x}_u$ is the velocity of the unsprung mass and r is the rolling radius of the wheel. The torque determined from the control algorithm is modulated onto the existing torque generated by the in-wheel electric motors that results from a throttle demand generated by a driver of the vehicle 100.

Although the present embodiment uses a control algorithm based on the Sky-Hook technique, any suitable control algorithm may be used, for example PID (Proportional Integral Differential) control in which the relative speed, acceleration or displacement of the unsprung and sprung masses is controlled to a target value by applying torque that is a linear sum of three terms relating to the deviation from the target value, the integral of the deviation from the target value and the differential of the deviation from the target value respectively.

Alternatively, other means for determining torque values may be used, for example the vehicle controller 102 may have access to a table that equates a specific torque value with a specific relative movement between the sprung and unsprung masses.

Figure 9:
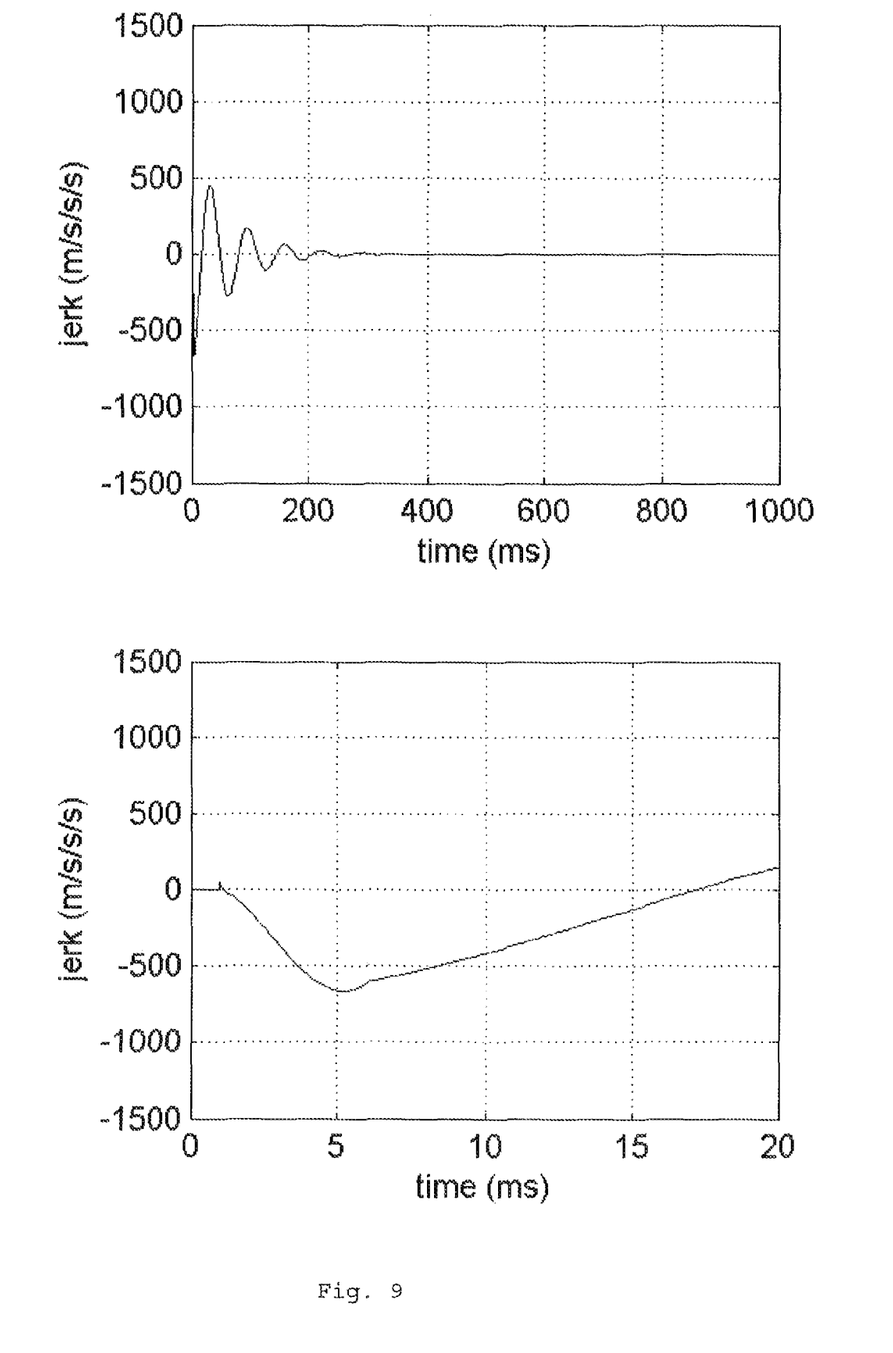
FIG. 9 illustrates a plot of change in acceleration resulting from a longitudinal acceleration being applied to an actively damped suspension according to an embodiment according to the present invention.

FIG. 9 illustrates a plot of change in acceleration resulting from a longitudinal acceleration being applied to an actively damped suspension according to an embodiment according to the present invention.

The change in acceleration plot illustrated in FIG. 9 is based on a suspension system where the passive suspension component has a damping constant b=0.3 Ns/mm with the vehicle controller 102 being arranged to modulate the respective in-wheel electric motor to increase damping after the initial shock, thereby combining the performance of a strongly damped suspension with the initial impact softness of the weakly damped passive suspension. The damping performance of the active suspension system is equivalent to that of a passive suspension of b=1.5 Ns/mm, this being the sum of the passive damping coefficient and the equivalent Sky-Hook damping coefficient $b_2$. However, the initial shock transferred to the body of the vehicle is equivalent to that of a soft passive suspension system with a damping constant b=0.3 Ns/mm Ideally the torque applied by the electric motor should be instantaneous in response to the change in relative speed, acceleration or displacement of the sprung and unsprung masses. However, in a practical system there will be delays resulting from the sensors, the vehicle controller 102 and the electric motor and in the communication between these components that result in an overall delayed response of the system. Preferably the total delay should not exceed a few milliseconds.

In the absence of road disturbances the relative speed of the vehicles sprung and unsprung masses will change as a result of a change in applied torque demanded by the driver. To avoid the active suspension system working against the torque demands made by the driver of the vehicle 100, preferably the vehicle controller 102 is arranged to avoid generating torque to oppose driver torque demands. However, as the driver torque demand is known and the characteristics of the longitudinal compliance of the wheel will be known, the active damping torque can be corrected accordingly.

Preferably the vehicle controller 102 is arranged to modulate the torque to provide active suspension torque only in response to large relative speeds or displacement of wheel and body that are indicative of a harsh impact but would not occur in normal acceleration or deceleration. That is to say, the vehicle controller 102 is arranged to only modulate the torque of an electric motor when the relative speed, acceleration or displacement of the sprung and unsprung masses exceeds a predetermined value.

Although the above embodiment is based on the vehicle controller 102 being used to increase the damping coefficient of the suspension system after an initial longitudinal shock has been applied to a vehicles wheel, in an alternative embodiment a strongly damped underlying passive suspension can be used with a high damping coefficient. In this embodiment the vehicle controller 102 would be arranged to reduce the damping coefficient upon the initial longitudinal shock being applied by opposing the large value of jerk during the impact. After the initial shock has occurred the damping effect provided by the electric motor is reduced, thereby relying on the strong damping coefficient provided by the underlying passive suspension.

The invention claimed is:

1. A suspension control system for a vehicle having a vehicle body, a wheel and a suspension device, wherein the wheel is mounted to the suspension device and the suspension device is mounted to the vehicle body at a mounting point on the vehicle body with an electric motor being arranged to apply to the wheel a torque for driving the wheel, the suspension control system comprising a controller arranged to modulate a torque applied to the wheel by the electric motor to dampen longitudinal movement of the wheel relative to the mounting point on the vehicle body based on a relative longitudinal or vertical movement of the wheel with respect to the mounting point on the vehicle body.

2. A suspension control system according to claim 1, wherein the controller is arranged to modulate the torque applied to the wheel to increase movement of wheel relative to the mounting point on the vehicle body.

3. A suspension control system according to claim 1 wherein the controller is arranged to modulate torque applied to the wheel based on $b_2(\dot{x}_s-\dot{x}_u)r$, where $b_2$ is a damping coefficient, $\dot{x}_s$ is a velocity of sprung mass of the vehicle, $\dot{x}_u$ is a velocity of the unsprung mass of the vehicle and r is a rolling radius of the wheel.

4. A suspension control system according to claim 1, wherein the controller is arranged to modulate torque applied to the wheel if a rate of change of longitudinal acceleration of the wheel relative to the mounting point exceeds a predetermined value.

5. A suspension control system according to claim 1, wherein the controller is arranged to modulate torque applied to the wheel based on a rate of change of longitudinal acceleration of the wheel with respect to the mounting point on the vehicle body.

6. A suspension control system according to claim 1, wherein the controller is arranged to modulate torque applied to the wheel based on a rate of change of longitudinal velocity of the wheel with respect to the mounting point on the vehicle body.

7. A vehicle comprising a suspension control system having a vehicle body, a wheel and a suspension device, wherein the wheel is mounted to the suspension device and the suspension device is mounted to the vehicle body at a mounting point on the vehicle body with an electric motor being arranged to apply to the wheel a torque for driving the wheel, the suspension control system comprising a controller arranged to modulate a torque applied to the wheel by the electric motor to dampen longitudinal movement of the wheel relative to the mounting point on the vehicle body based on a relative longitudinal or vertical movement of the wheel with respect to the mounting point on the vehicle body.

8. A vehicle according to claim 7, further comprising a sensor for determining the relative longitudinal movement of the wheel relative to the mounting point.

9. A vehicle according to claim 7, wherein the electric motor is an in-wheel electric motor.

10. A vehicle according to claim 7, further comprising a plurality of wheels mounted to the vehicle via a respective suspension device mounted to a mounting point on the vehicle body, wherein at least two of the wheels are arranged to be driven by respective electric motors and the controller is arranged to modulate the torque of the respective electric motors based on the relative longitudinal movement of the wheel being driven by the respective electric motor with respect to the respective mounting points on the vehicle body.

* * * * *